(12) United States Patent
Wright

(10) Patent No.: US 6,692,614 B2
(45) Date of Patent: Feb. 17, 2004

(54) JOINTING PRESS

(75) Inventor: Marshall Wright, Bingley (GB)

(73) Assignee: Hab Asit Limited (GB)

( * ) Notice: Subject to any disclaimer, the term of this patent is extended or adjusted under 35 U.S.C. 154(b) by 39 days.

(21) Appl. No.: 10/000,834

(22) Filed: Oct. 24, 2001

(65) Prior Publication Data

US 2003/0075280 A1 Apr. 24, 2003

(51) Int. Cl.$^7$ .............................................. B30B 15/34
(52) U.S. Cl. ............................ 156/583.4; 156/583.1; 100/219
(58) Field of Search ......................... 156/583.1, 582, 156/137, 583.4, 583.3, 138–142, 583.2, 583.5, 583.6, 583.7, 583.8, 583.9, 583.91; 100/219

(56) References Cited

U.S. PATENT DOCUMENTS

| | | | |
|---|---|---|---|
| 3,969,051 A | | 7/1976 | Hovila .......................... 425/11 |
| 4,187,776 A | * | 2/1980 | Schroder .................... 100/325 |
| 4,430,146 A | * | 2/1984 | Johnson ................... 156/583.1 |
| 4,927,345 A | * | 5/1990 | Takei et al. .................... 425/77 |
| 5,562,796 A | * | 10/1996 | Ertel .......................... 156/498 |
| 5,611,267 A | | 3/1997 | Lauderbaugh ............... 100/38 |

FOREIGN PATENT DOCUMENTS

| DE | 2 121 701 | 10/1972 |
|---|---|---|
| DE | 201 00 627 U 1 | 6/2001 |

OTHER PUBLICATIONS

Specification sheets entitled "Walker Belt Preparation and Joining Equipment" by Charles Walker & Co. Ltd. dated Jun. 1998.

\* cited by examiner

Primary Examiner—Richard Crispino
Assistant Examiner—George R. Koch, III
(74) Attorney, Agent, or Firm—Factor & Partners

(57) ABSTRACT

The present invention relates to a jointing press for jointing a first and second free end of one or more belts which is adapted to raise directly the temperature of the surface of the belt (or belts) thereby decreasing heat-up times and which exploits the unheated platens to act as a heat sink in the cooling step thereby eliminating the need for external water or forced air cooling sources.

20 Claims, 2 Drawing Sheets

JOINTING PRESS

Figure 1:
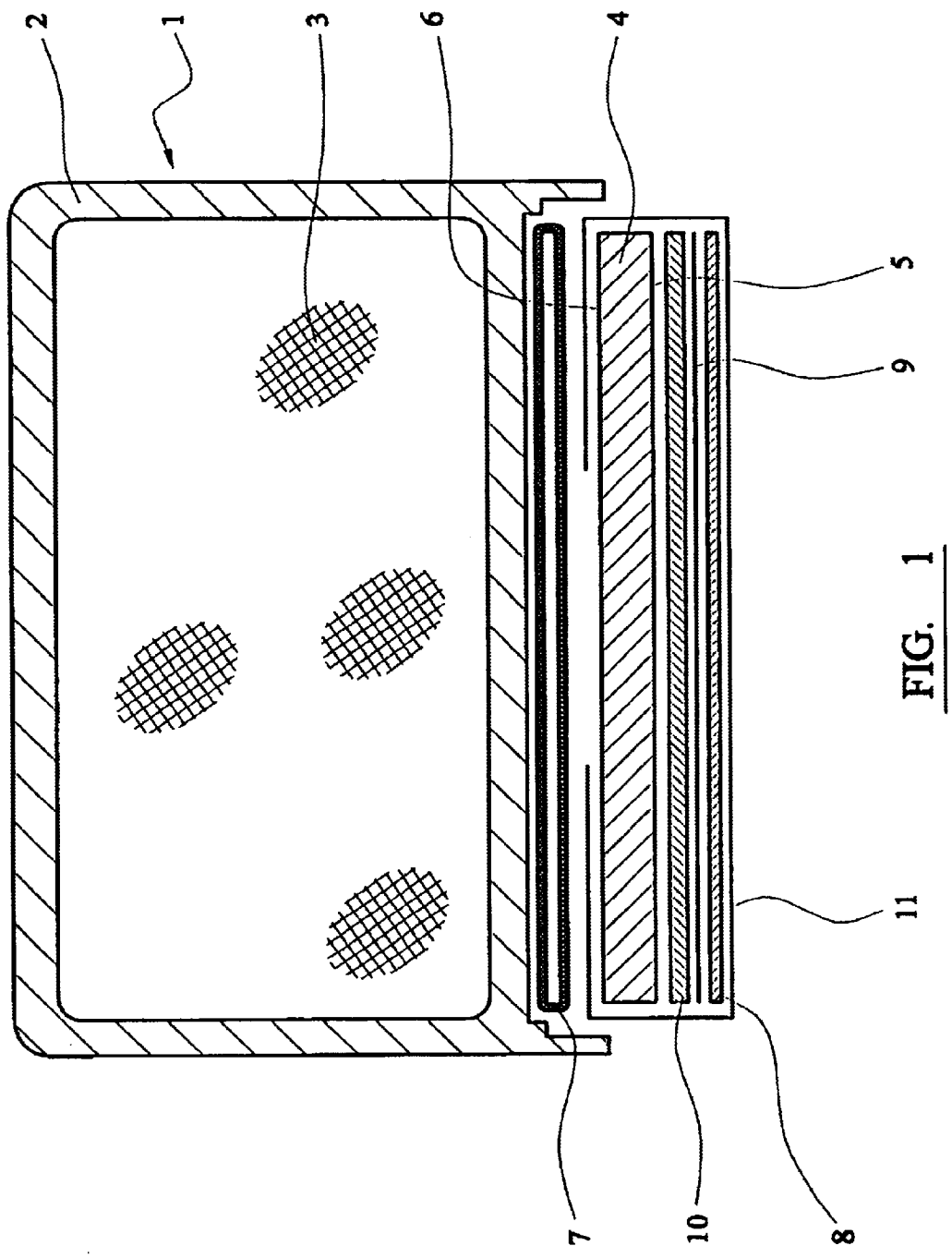

The present invention relates to a jointing press for jointing a first and second free end of one or more belts (eg a conveyor, drive or transfer belt).

There are numerous industries which may exploit belting as a load conveyor with a load conveying surface. Belting may be used for straightforward transportation between two points or for passing a load through successive processing operations. Belting is particularly useful for conveying foodstuffs in food processing or food handling applications. For this purpose, the highest standards of cleanliness are imposed on the industry.

Belt fitting and jointing to make (or repair) a belt (eg an endless belt) requires precision equipment able to cater for set-up and occasional in-house belt failure. Conventional equipment for this purpose includes jointing presses (or vulcanising presses) which operate by applying pressure to the heated surface of a belt (or belts) defining two free ends of the belt (or belts) followed by cooling. Jointing presses are primarily used by belting manufacturers to produce a finished belt for delivery to the end user or by an end user for jointing or repairing a belt on site. For use on site, the jointing press needs to be light and transportable and to operate rapidly to shorten plant down times.

A conventional jointing press principally comprises a first and second steel box adapted to capture and apply pressure evenly to the heated surface of the belt (or belts) defining the two free ends of the belt (or belts). The even application of pressure and heat is achieved by capturing the relevant surface between two platens. Each platen is typically a 10 to 15 mm thick aluminium sheet. A thermocouple-controlled heating element to the rear of the platen raises the temperature of the platen whereby to heat indirectly the surface of the belt (or belts) defining the two free ends of the belt (or belts). To raise the temperature of the platen sufficiently, various types of heating element may be used (eg mica resistance wires in a silicon sheet). An air bag may be located in one (or both) of the aluminium boxes which when it is inflated exerts sufficient force on the rear of the platen to cause the platens to squeeze together and effect jointing of the free ends of the belt.

In order to cool the belt whilst still under pressure, it is necessary to cool the platen. This may be achieved by ensuring that the heating element falls short of the periphery of the rear surface of the platen and installing a cooling tube (or tubes) in the periphery. Water fed into the cooling tube serves to cool the platen. Alternatively, forced air cooling may be utilised eg the rear of the platen may be provided with a series of fins across which cooling air is blown by a fan.

There are a number of disadvantages associated with the operation of conventional jointing presses. Firstly, the indirect heating and cooling of the belt through the platen is inefficient (eg considerably less heat is need to raise the temperature of a 0.5 mm thick belt than is needed to raise the temperature of a 15 mm thick aluminium platen). Secondly, water for cooling purposes is usually provided on site for convenience in a small transportable barrel and the water is typically recirculatory. This is particularly undesirable for the food industry where there is an increasing demand to eliminate potential sources of food contamination (such as water borne contamination). Thirdly, sharp temperature differentials at the edge of the platen may lead to undesirable rippling or creasing of the belt surface and thereby destroy its serviceability. To eliminate such sharp temperature differentials, separate stainless steel or glass composite sheets are inserted between the platen and the belt surface to ensure smooth temperature gradients at and beyond the edge of the platen and across the surface of the belt.

The present invention seeks to improve the effectiveness of jointing presses by dispensing with indirect heating. More particularly, the present invention relates to a jointing press adapted to raise directly the temperature of the surface of a belt (or belts) thereby decreasing heat-up times. By dispensing with the need to raise the temperature of the platen, the platen can be exploited advantageously to act as a heat sink in the cooling step thereby eliminating the need for external water or forced air cooling sources (which in turn improves hygiene).

Thus viewed from one aspect the present invention provides a jointing press for jointing a first free end and a second free end of a belt (or belts), said jointing press comprising:

a first and second supporting means each supporting a platen so as to expose a pressing surface thereof and a heating element adjacent to and substantially thermally insulated from said pressing surface;

a contact coating applied to said heating element of each of said first and second supporting means, wherein in use the first supporting means and second supporting means are stacked whereby to capture between the contact coating applied to the heating element of the first supporting means and the contact coating applied to the heating element of the second supporting means a surface of a belt (or belts) defining the first and second free end of the belt (or belts); and an urging means for progressively urging together the pressing surface of the platen supported by the first supporting means and the pressing surface of the platen supported by the second supporting means whereby to apply pressure to the surface of the belt (or belts) defining the first and second free end of the belt (or belts).

The jointing press of the invention may be advantageously used to provide rapid and efficient jointing times of between five and ten minutes. This compares favourably with jointing times typically between twenty and forty minutes for conventional water cooled jointing presses. It is envisaged that the primary utility of the jointing press of the invention will be for on-site jointing involving occasional jointing operations rather than mass production involving multiple successive jointing operations which would result in a gradual increase in temperature of the platens and extended cooling times.

In an embodiment of the invention, the contact coating is composed at least partially of a non-stick material such as a non-stick polymer eg TEFLON®.

In a preferred embodiment, the heating element is adapted to provide zonal heating. Preferably the heating element is adapted to heat within the edges of the contact coating. By advantageously leaving the edges of the contact coating unheated, it is possible to generate a smooth temperature gradient across the surface of the belt to avoid rippling or creasing of the belt thereby dispensing with the need for additional steel or glass sheets (as mentioned hereinbefore). Additionally, leaving the edges unheated reduces press penetration into the belt and improves clamping of the belt. Typically the heating element is a resistance wire (eg mica resistance wire) embedded in a suitable support such as silicon.

Each supporting means may adopt a box-like configuration for housing the body of the platen in such a manner as to expose the pressing surface thereof. Preferably the supporting means is a carbon fibre shell which is lightweight rendering the jointing press readily transportable with the added advantage that it is essentially non-yieldable under high pressures thereby improving jointing. The supporting means in a box-like configuration may house a foam or sponge-like material and/or a cooling means eg a forced air cooling means such as a fan. The foam or sponge-like material may be rigid to add to the strength of the carbon fibre shell.

The heating element may be substantially thermally insulated from said pressing surface by one or more insulating fillers. A preferred insulating filler is a rigid silicon glass sheet which advantageously has a very low coefficient of expansion. The rigid silicon glass sheet may be used adjacent an insulating fabric layer. Typically the insulating fabric layer is intermediate the platen and rigid silicon glass sheet. The insulating fabric layer may be an insulating layer of Nomex fabric which slows heat loss to the platen during heat-up.

The heating element of the first and second supporting means may be controlled individually for sensitive temperature adjustment using conventional means (eg thermocouples and a suitable controller). The temperature controller typically controls the temperature and a timer provides adjustment of temperature dwell time. The jointing press may comprise a controller usable at either 110V or 220V, preferably usable at either 110V or 220V without switching (ie automatically). Pressure gauges may be provided on or in the supporting means together with an air inlet/outlet means.

In an embodiment of the invention, the urging means is pneumatically driven. Preferably the urging means comprises: an inflatable body (eg an air bag) supported in the first supporting means to the rear of the pressing surface of the platen. Particularly preferably the urging means comprises: a first inflatable body (eg an air bag) supported in the first supporting means to the rear of the pressing surface of the platen and a second inflatable body (eg an air bag) supported in the second supporting means to the rear of the pressing surface of the platen. The latter embodiment advantageously provides a consistently flat joint profile, In a preferred embodiment of the invention, to the first supporting means (and optionally the second supporting means) is secured one or two supporting lips for bearing at least a part (eg the edge) of the surface of a belt (or belts) defining the first and second free end of the belt (or belts). For example the (or each) supporting lip extends along a face of the first supporting means substantially coplanar with the contact coating (and typically parallel and adjacent to the contact coating). To the (or each) supporting lip may be fitted a retaining member (eg a clamping bar) to hold the free ends of the belt (or belts) during installation in the jointing press. The retaining member may be actuated by a screw tightening device.

In use, the first supporting means and second supporting means are stacked with the contact coating applied to the heating element of the first supporting means facing the contact coating applied to the heating element of the second supporting means and with the surface of a belt (or belts) defining the first and second free end of the belt (or belts) therebetween. Preferably the first supporting means and second supporting means are adapted to be interlockably stacked. For example, each end of the first supporting means may comprise an end profile capable of mating with an end profile on each end of the second supporting means in order to withstand relative axial and transverse movement of the first and second supporting means during jointing.

Preferably one or more clamping devices are mounted on the first and second supporting means to withstand any tendency for the contact coatings to diverge. For example, the (or each) clamping device may comprise a locking element pivotally mounted on the first supporting means capable of pivotally engaging a retaining member on the second supporting means. Typically the clamping device is pivotally mounted at or near to the end of the first supporting means. The pivotally mounted locking element on the first supporting means may comprise two upstanding arms secured in substantially parallel spaced apart relationship by a cross member (eg in a substantially U-shaped configuration), wherein the cross member is adapted to pivotally engage the retaining member. For example, the retaining member may be an upstanding flange on the surface of the second supporting means incorporating a receiving channel engageable with the cross member. The cross member may be provided with a handle to assist pivoting. Alternatively, the retaining member may be a threaded bore in the second supporting means being threadedly engageable with a threaded fastener on the cross-member.

One of the first and second supporting means may be provided with a handle to assist portability.

Figure 2:
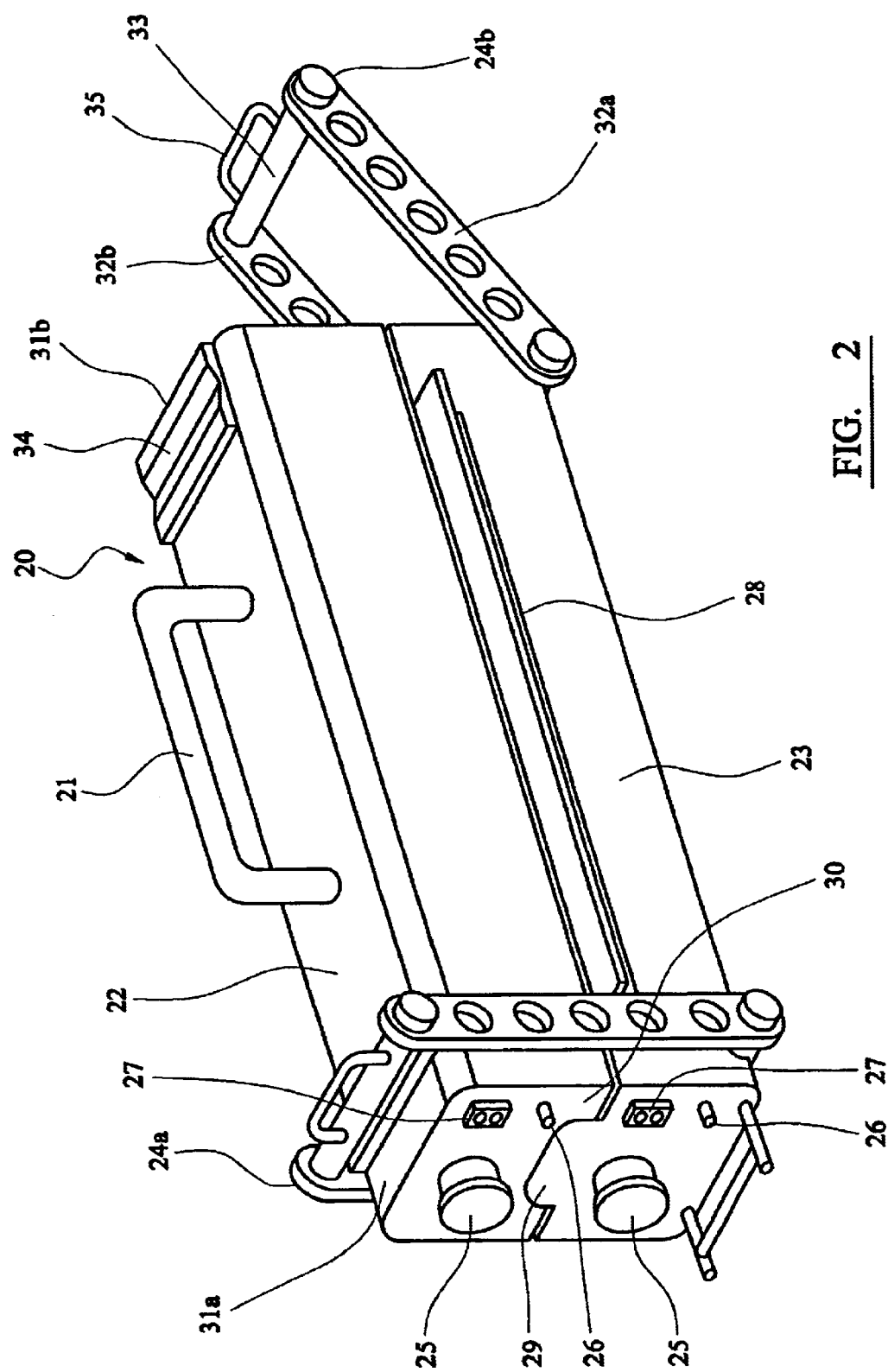

The present invention will now be described in a non-limitative sense with reference to the accompanying figures in which:

FIG. 1 illustrates an exploded profile view of the first supporting means of an embodiment of the jointing press of the invention; and FIG. 2 illustrates a perspective view of an embodiment of a jointing press of the invention.

FIG. 1 illustrates an exploded profile view of a first supporting means of an embodiment of the jointing press of the invention designated generally by reference numeral 1. The first supporting means 1 comprises a carbon fibre shell 2 with a foam core 3 which supports an aluminium platen 4 to expose a pressing surface 5. To the rear of the aluminium platen 4 is an air bag 7 which when inflated progressively applies a force to the rear surface 6 of the platen 4. A heating element 8 is adjacent to the pressing surface 5 and thermally insulated therefrom by a silicon glass insulator 9 and a Nomex fabric insulating layer 10 which slows down heat loss to the platen 4. To the exterior surface of the heating element 8 is applied a Teflon® contact coating 11 which envelopes platen 4 and insulating layers 9 and 10 and is attached to the rear surface 6 of the platen 4.

FIG. 2 illustrates a perspective view of an embodiment of a jointing press of the invention designated generally by reference numeral 20. The jointing press 20 comprises first and second supporting means 22 and 23 which are both of the type described hereinbefore with reference to FIG. 1 and which are stacked to capture (between the contact coating applied to the heating element of the first supporting means and the contact coating applied to the heating element of the second supporting means) a surface of a single belt defining the first and second free end of the belt (or alternatively a surface of a first and of a second belt defining a free end of each belt respectively). The surface of the belt (or belts) is not shown in this view.

Each end of the second supporting means 23 comprises an end profile 29 mating with an end profile 30 on the corresponding end of the first supporting means 22 in order to withstand relative axial and transverse movement of the first and second supporting means 22 and 23. Clamping devices are mounted on the ends of the first and second supporting means 22 and 23 and in FIG. 2, one clamping device is locked and the other is unlocked. Each clamping device comprises a locking element 24a, 24b pivotally mounted on the second supporting means 23 and capable of pivotally engaging a retaining member 31a, 31b on the first supporting means 22. The locking element 24b comprises two upstanding arms 32a, 32b secured in substantially parallel spaced apart relationship by a cross member 33 which engages the retaining member 31b. The retaining member 31b is an upstanding flange on the surface of the first supporting means 22 incorporating a receiving channel 34 engageable with the cross member 33. The cross member 33 is provided with a handle 35 to assist pivoting.

To the second supporting means 23 is secured a supporting lip 28. The ends of the first and second supporting means 22 and 23 are provided with electrical connections 25 and thermocouple connections 27 for the heating element and air connections 26 for inflating the air bags. To assist portability, the first supporting means 22 is provided with a handle 21.

What is claimed is:

1. A jointing press for jointing a first free end and a second free end of a belt or belts, said jointing press comprising:

a first and second supporting means each supporting a platen so as to expose a pressing surface thereof and a heating element adjacent to and substantially thermally insulated from said pressing surface, wherein the heating element is adapted to provide zonal heating;

a contact coating applied to said heating element of each of said first and second supporting means, wherein in use the first supporting means and second supporting means are stacked whereby to capture between the contact coating applied to the heating element of the first supporting means and the contact coating applied to the heating element of the second supporting means a surface of a belt or belts defining the first and second free end of the belt or belts; and an urging means for progressively urging together the pressing surface of the platen supported by the first supporting means and the pressing surface of the platen supported by the second supporting means whereby to apply pressure to the surface of the belt or belts defining the first and second free end of the belt or belts.

2. A jointing press as claimed in claim 1 wherein the heating element is adapted to heat within the edges of the contact coating.

3. A jointing press as claimed in claim 1 wherein each of the first and second supporting means adopts a box-like configuration for housing the body of the platen in such a manner as to expose the pressing surface thereof.

4. A jointing press as claimed in claim 3 wherein each of the first and second supporting means houses a foam or sponge-like material.

5. A jointing press as claimed in claim 1 wherein each of the first and second supporting means is a carbon fibre shell.

6. A jointing press as claimed in claim 1 wherein the heating element is substantially thermally insulated from said pressing surface by an insulating filler.

7. A jointing press as claimed in claim 6 wherein the insulating filler is a rigid silicon glass sheet.

8. A jointing press as claimed in claim 1 wherein the urging means is pneumatically driven.

9. A jointing press as claimed in claim 8 wherein the urging means comprises: an inflatable body supported in the first supporting means to the rear of the pressing surface of the platen.

10. A jointing press as claimed in claim 9 wherein the urging means comprises: a first inflatable body supported in the first supporting means to the rear of the pressing surface of the platen and a second inflatable body supported in the second supporting means to the rear of the pressing surface of the platen.

11. A jointing press as claimed in claim 1 wherein to the first supporting means is secured one or two supporting lips for bearing at least part of the surface of the belt or belts defining the first and second free end of the belt or belts.

12. A jointing press as claimed in claim 11 wherein the supporting lip or lips extends along a face of the first supporting means substantially coplanar with the contact coating.

13. A jointing press as claimed in claim 1 wherein in use the first supporting means and second supporting means are stacked with the contact coating applied to the heating element of the first supporting means facing the contact coating applied to the heating element of the second supporting means and with the surface of a belt or belts defining the first and second free end of the belt or belts therebetween.

14. A jointing press as claimed in claim 13 wherein the first supporting means and second supporting means are adapted to be interlockably stacked.

15. A jointing press as claimed in claim 13 wherein each end of the first supporting means comprises an end profile capable of mating with an end profile on each end of the second supporting means to withstand relative axial and transverse movement of the first and second supporting means.

16. A jointing press as claimed in claim 1 wherein one or more clamping devices are mounted on the first and second supporting means to withstand any tendency for the contact coatings to diverge.

17. A jointing press as claimed in claim 16 wherein the clamping device or devices comprises a locking element pivotably mounted on the first supporting means capable of pivotally engaging a retaining member on the second supporting means.

18. A jointing press as claimed in claim 17 wherein the locking element comprises two upstanding arms secured in substantially parallel spaced apart relationship by a cross member, wherein the cross member is adapted to pivotally engage the retaining member.

19. A jointing press as claimed in claim 17 wherein the retaining member is an upstanding flange on the surface of the second supporting means incorporating a receiving channel engageable with the cross member.

20. A jointing press as claimed in claim 1 wherein the contact coating is composed at least partially of polytetrafluoroethylene.

* * * * *